United States Patent Office 2,953,439
Patented Sept. 20, 1960

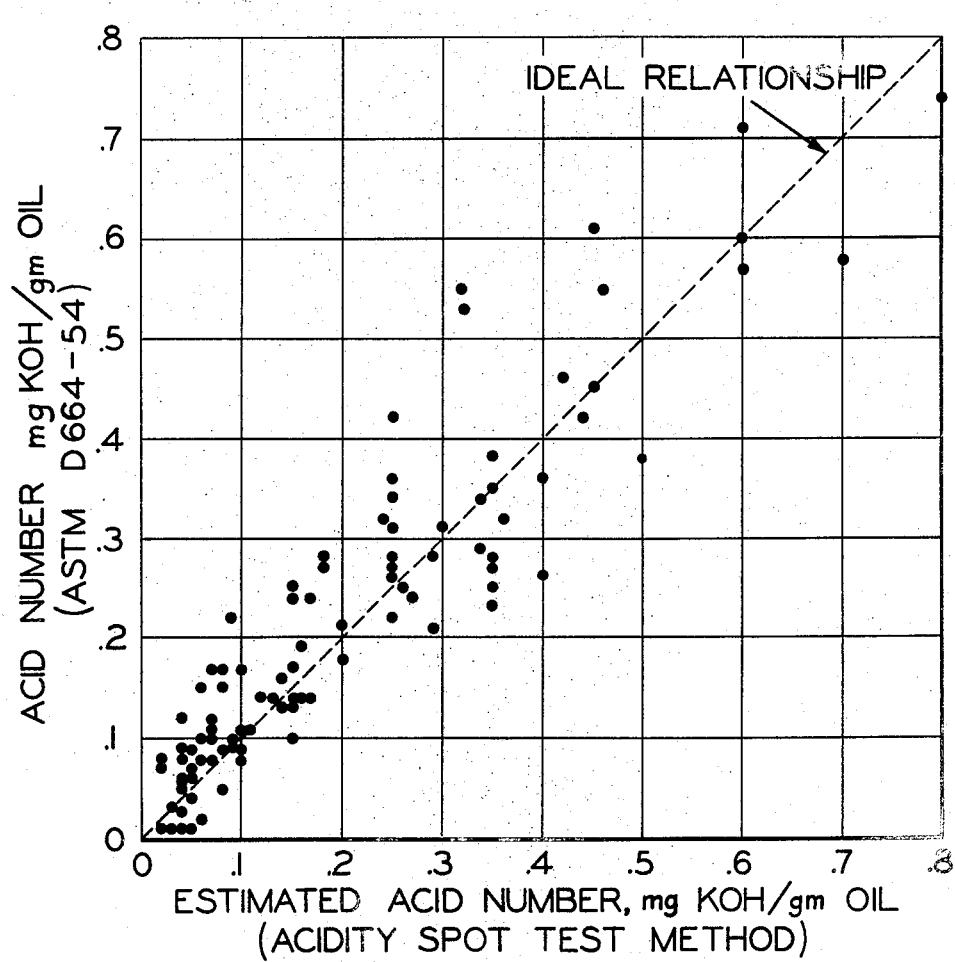

2,953,439
SPOT TEST METHOD FOR ESTIMATING NEUTRALIZATION NUMBER OF A MINERAL OIL

William E. Elliott, Elm Grove, Richard E. Reinhard, West Allis, and Eugene P. Schram, Wauwatosa, Wis., assignors to Allis-Chalmers Manufacturing Company, Milwaukee, Wis.

Filed Dec. 26, 1957, Ser. No. 705,454

5 Claims. (Cl. 23—230)

This invention relates to a spot test method for estimating neutralization number of a mineral oil and more particularly to a spot test method of making such a determination that can be accomplished quickly and inexpensively in the field without the need of expensive equipment and technically trained personnel.

Neutralization number, as the term is used herein, refers to the quantity of acid, expressed in terms of the equivalent number of milligrams of potassium hydroxide, required to neutralize all basic constituents present in one gram of oil or to the number of milligrams of potassium hydroxide required to neutralize the free fatty acids in a gram of oil. Regardless whether the oil possesses acidic or basic characteristics, the neutralization number of the oil is expressed in units of milligrams of potassium hydroxide per gram of oil. The acid number, as the term is used herein, is included within the definition of the term "neutralization number" and represents the number of milligrams of potassium hydroxide required to neutralize the free fatty acids in a gram of oil. The predetermined critical value of the neutralization number or acid number denotes the preselected criterion for which the spot test method is designed.

The novelty of the present invention is predicated to a considerable extent on the discovery that by using a color change adjustor solution to form a background spot within which a second spot of the oil to be tested is formed, a desired color pattern can be obtained when an acid-base color indicator is added and the neutralization number of the oil tested is equal to the predetermined critical value. The use of a spot formed by the color change adjustor solution as a background makes it possible to devise a simple method for testing an oil that involves only an observation of a color pattern to determine whether the neutralization number of the oil is above or below the predetermined critical value or, if desired, to determine the approximate value of the neutralization number.

The present invention is particularly useful in the field testing of mineral oils when it becomes necessary to determine whether the acidity of an oil in use has reached a dangerous level. A transformer oil is a typical example of mineral oil that requires periodic testing of its acid-base characteristics. The prior practice among utilities is to send samples of the oil to a laboratory to determine the neutralization number of the oil. The spot test method of the present invention provides a rapid, simple, and inexpensive way of estimating the neutralization of such mineral oils as are used in transformers and the like.

The first step of the present invention comprises placing a small quantity of the color change adjustor solution on a porous medium, such as filter paper, to form a spot thereon. When the color change adjustor solution has been absorbed by the porous medium, a small amount of the mineral oil to be tested is placed upon the spot formed by the solution. After the drops of oil have been absorbed, a small amount of an acid-base color indicator is placed on the oil spot formed. As the indicator spot spreads over the oil spot, a color pattern is developed. From this color pattern the neutralization number of the oil can be quantitatively or qualitatively determined in a manner that will be described with reference to an example to be hereinafter set forth.

It is, therefore, an object of the present invention to provide a spot test method for estimating the neutralization number of a mineral oil.

A further object of this invention is to provide a spot test method for determining whether a mineral oil is above or below a predetermined critical value.

It is still a further object of the present invention to provide a spot test method for estimating neutralization number of an oil, which does not necessitate the use of expensive apparatus or highly skilled personnel.

Objects and advantages other than those set forth above will be apparent from the following description when read in connection with the accompanying drawing in which the figure of the drawing is a plot of the acid number as determined by conducting tests of 108 samples of used transformer oil by the test method prescribed by the American Society for Testing Materials Standard D664–54 and by the estimating of the acid number in accordance with the method of the present invention.

Although the preferred practice of the method of the present invention is illustrated by its application to a transformer oil, it is not intended to limit the practice of the present invention to this application alone. The first step in the preferred method involved the formation of a spot on a suitable porous medium by a color change adjustor solution of a predetermined strength. The exact quantity of color change adjustor solution used is not material so long as a sufficient quantity is deposited on the surface of the porous medium to form a wetted area that will furnish a background for the spot to be formed by the oil tested and the acid-base indicator spot used to develop a desired color pattern. When an analytical filter paper is used as a porous medium and two drops of oil are used, it was found that approximately three drops of the color change adjustor solution will form a sufficiently large wetted area. A selected quantity, as the term is used herein, denotes an amount of liquid that will spread over the porous medium to form a spot large enough to be easily observed.

The drops used to form the spot on the porous material may be dispensed by any suitable apparatus. In the laboratory it was found that a syringe serves as a very convenient apparatus to dispense the liquids used in the formation of the spots. For testing an oil in the field it was found that an ordinary medicine dropper will satisfactorily serve the purpose.

The strength of the color adjustor solution used to practice the present invention is determined in advance of the tests to be conducted and thereafter it can be used for all further tests. For example, if it is desired to determine whether a particular transformer oil has an acidity above or below an equivalent acidity of 0.3 milligram of potassium hydroxide per gram of oil, an oil sample having a 0.3 acid number is first obtained or prepared. This oil sample is then used as a standard liquid to experimentally determine the required strength of the color change adjustor solution which will cause a selected acid-base indicator spot to exhibit an approximately equal distribution of a first and second color on the oil spot.

An organic acid-base indicator should be selected which will exhibit the desired color distribution at a hydronium ion concentration of the spot system corresponding to the predetermined critical value. At relatively low hydronium ion concentrations any change in the hydronium ion concentration effects a substantial change in the pH. Since the acid-base indicator develops color in response to changes in pH of the system, it also indirectly responds to the hydronium ion concentration which is related to the amount of acids present in the system.

The B.D.H. Universal Indicator manufactured by the British Drug House Ltd. and hereinafter referred to as the "universal indicator" was found to be particularly suitable because it possesses a wide variety of color changes for a wide range of pH values. Although the universal indicator was used in the method illustrating the preferred practice of the invention, it should be readily apparent to one skilled in the art that any acid-base indicator can be used to practice the invention disclosed herein.

The color pattern obtained by the use of a particular acid-base indicator will depend upon the pH of the spot system. The exact pH obtained depends upon the amount of acids present in the oil to be tested and the degree of ionization of the acids. In the preferred embodiment, a sodium carbonate solution is used as the color change adjustor solution. The water in the spot formed by the carbonate solution causes ionization of the acids present in the mineral oil being tested.

The universal indicator develops a color pattern containing an approximately equal distribution of green and yellow when the acid-base level of the system is near the neutral point. The strength of the sodium carbonate solution used as the color change adjustor solution should therefore be sufficient to neutralize all of the acid present in an oil having the acid number of approximately 0.30. Thus, if an oil tested has a neutralization number of less than 0.30, an excess of sodium carbonate remains after the acid is neutralized and the system has a pH in the alkaline range. For the more alkaline oils the universal indicator will develop a color pattern consisting of a predominantly green spot with a blue periphery. If the neutralization number of the mineral oil tested is greater than 0.30, the system will have a pH in the acid range, since the amount of the sodium carbonate present in the background spot is insufficient to neutralize the acid present in the oil spot. On oils of higher acidity the universal indicator will develop a color pattern consisting of yellow-orange or red-orange spot with a blue periphery. Thus, when the universal indicator is used in the practice of the present invention, the predominance of the color green in the spot delineated by the blue border indicates that the acid number of the oil is below 0.30. If a quantitative value is desired, the color pattern obtained within the range of values for which an indicator is selected can be compared with a known color pattern standard. It should be readily apparent that such interpretations can be readily made by personnel who have a minimum of technical training.

The strength of the color adjustor solution may be determined by trial and error. Starting with a trial solution for example, consisting of a 0.007 normal sodium carbonate (solution may be either slightly alkaline or acidic), three drops were placed on an analytical filter paper, such as Whatman No. 4, which will be used in the spot test method. When the trial color adjustor solution has been absorbed by the filter paper, two drops of the standard liquid having a neutralization number of 0.30 are added. When the standard liquid has been absorbed, one drop of the universal indicator is placed on the standard liquid drop. The above procedure is repeated with color adjustor solutions of an increased or decreased strength until the solution is just barely weak enough or strong enough to cause the spot to develop the color pattern desired.

The strength of the color adjustor solution used in the method exemplifying the present invention was adjusted so that the color pattern obtained by the indicator on the standard liquid spot contained an approximately equal distribution of a first and second color, green and yellow, in this case. Thus, if the oil to be tested possesses an acidity corresponding to 0.30 milligram of potassium hydroxide per gram of oil, the color pattern of the indicator spot will exhibit an approximate equal distribution of green and yellow. If it is more acidic, the color pattern of the indicator spot will be predominantly yellow; and vice versa, if it is less acidic, the color pattern will be predominantly green. Thus, the predominance of one of the colors over the other indicates whether the oil tested is above or below the predetermined critical value of 0.30.

The type of porous medium used to practice the method of the present invention is not material so long as it uniformly absorbs the oil which is to be tested, the indicator, and color adjustor solution. The analytical filter papers are preferred because they are economical and readily available. Whatman No. 4 analytical filter paper was used in conducting the various tests made to exemplify the preferred practice of this invention. A suitable porous medium should possess uniform absorptive properties and should be light in color so that the indicator colors can be sharply defined against the liquid to be tested.

A significant feature of the present invention is that by the use of a color change adjustor solution, a wide range of color changes are possible for the various oils that may be tested. By selecting a color pattern that will contrast the color of the liquid, it is possible to more effectively utilize the spot test method of determining the neutralization number of an oil.

The drawing illustrates a graph of acid numbers determined by the spot test method of the present invention compared to acid numbers as determined by the American Society for Testing Materials Standard D664-54, hereinafter referred to as the standard laboratory method. The universal indicator and a 0.007 normal sodium carbonate solution were used in the spot test method. The ideal relationship between the two sets of values is represented by the dotted line in the drawing. The points that fall above this dotted line represent oil samples for which the acid numbers obtained by the spot test method in accordance with the present invention were lower than the values obtained by the standard laboratory method. The points below the dotted line are for oils for which the acid numbers obtained by the spot test method were higher than the values obtained by the standard laboratory method. It should be noted that for oils having an acid number below 0.50, only a very few of the values obtained by either test differ from each other by 0.10. Approximately 4.6 percent of the values of the acid numbers estimated by the spot test method to be below the 0.30 predetermined critical value were found by the standard laboratory method to be actually above the critical value.

The exact mechanism of the spot test method which is the subject of this invention is not completely understood. The porous medium serves as a suitable background for absorbing and spreading out the liquids used to form the spots according to the present method. When an oil is placed on the porous medium, the acids present in the liquids concentrate on the surface of the porous medium. Where a filter paper is used, the acids concentrate on the upper surface of the fibers.

The water in the color change adjustor solution then causes the ionization of the acid molecules into an acid radical ion and a hydrated hydrogen ion, referred to herein as a hydronium ion. At relatively low hydronium ion concentration in the oil, any change in the hydronium ion concentration affects the pH. When the indicator comes into contact with the oil-water-paper system, it assumes a color characteristic of the pH of the system. Since the color change adjustor solution serves to keep the concentration of hydronium ions low, it is thereby possible to use a conventional pH indicator as a convenient indicator of the acid-base level of a system.

Although the preferred procedure has been described to enable one skilled in the art to practice the present invention, it should be understood that the detailed steps and material used are illustrative of the method and not in limitation thereof. Further, general modifications and adaptations as would readily occur to one skilled in the chemical arts are intended to be equally contained within the scope of the present invention, the present invention being limited only by the appended claims.

What is claimed is:

1. A spot test for determining whether the neutralization number of a mineral oil is at, above or below a predetermined critical value by observing the colors developed by an organic acid-base indicator exhibiting an approximately equal distribution of a first and second color in an oil spot having a neutralization number at said predetermined critical value, said method comprising the steps of: placing a selected quantity of a color change adjustor solution consisting essentially of sodium carbonate on a porous medium possessing uniform absorptive properties to form a spot thereon, said color adjustor solution having sufficient neutralizing strength so that when a spot formed on said porous medium by said solution is combined with a spot formed by a standard liquid having a neutralization number of said predetermined critical value, the addition of said organic acid-base indicator will develop a color pattern having an approximately equal distribution of said first and second colors; placing a selected quantity of said mineral oil to be tested within said spot formed by said color change adjustor solution to form an oil spot thereon; and depositing a selected quantity of an organic acid-base indicator consisting essentially of a universal indicator on said oil spot, the predominance of one of said colors over the other providing an estimate whether said oil is above or below said predetermined critical value.

2. A spot test method as set forth in claim 1 wherein said porous medium is a filter paper.

3. A spot test method for estimating the neutralization number of a mineral oil within a range of values above or below a predetermined critical value by comparing the color pattern developed on a spot formed by said oil by an organic acid-base indicator exhibiting an approximate equal distribution of a first and second color in an oil spot having a neutralization number at said predetermined critical value, said method comprising the steps of: placing a selected quantity of a color change adjustor solution consisting essentially of sodium carbonate on a porous medium possessing uniform absorptive properties to form a spot thereon, said solution having sufficient neutralizing strength so that when a selected quantity of standard liquid having a neutralization number within said range of values is placed on a spot formed by said solution on a porous medium, an organic acid-base indicator will develop an approximately equal distribution of said first and second color on the spot formed by said standard liquid; placing a selected quantity of said mineral oil to be tested on said spot formed by said color change adjustor solution to form an oil spot thereon; and placing a selected quantity of an organic acid-base indicator consisting essentially of a universal indicator on said oil spot to develop a color pattern.

4. A spot test method as set forth in claim 3 wherein said porous medium is a filter paper.

5. A spot test method for estimating the acid number of a transformer oil within a range of values above or below a predetermined critical value by comparing the color pattern developed in a spot formed by said oil by an organic acid base indicator exhibiting an approximately equal distribution of yellow and green in an oil spot having a neutralization number at said predetermined critical value, placing a selected quantity of a sodium carbonate solution on a filter paper to form a spot thereon, said solution having sufficient neutralizing strength so that when a selected quantity of a standard liquid having a neutralization number within said range of values is placed on a spot formed by said solution on said filter paper, and organic acid base indicator will develop an approximately equal distribution of green and yellow on the spot formed by said standard liquid; placing a selected quantity of said transformer oil to be tested on said spot formed by said sodium carbonate solution to form an oil spot thereon; and placing a selected quantity of an acid-base indicator consisting essentially of a universal indicator on said oil spot to develop a color pattern.

References Cited in the file of this patent

UNITED STATES PATENTS

| | | |
|---|---|---|
| 2,249,867 | Snelling | July 22, 1941 |
| 2,838,377 | Fonner | June 10, 1958 |
| 2,862,796 | Gomberg | Dec. 2, 1958 |

OTHER REFERENCES

Feigl: "Spot Tests in Organic Analysis," 5th Ed., 1956, pp. 482–483.